US012731003B2

(12) United States Patent
Yen

(10) Patent No.: US 12,731,003 B2
(45) Date of Patent: Sep. 8, 2026

(54) IMAGE DETECTION METHOD BASED ON NEURAL NETWORK MODEL, ELECTRONIC DEVICE, AND STORAGE MEDIUM

(71) Applicant: HON HAI PRECISION INDUSTRY CO., LTD., New Taipei (TW)

(72) Inventor: Chien-Wu Yen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 1015 days.

(21) Appl. No.: 17/955,876

(22) Filed: Sep. 29, 2022

(65) Prior Publication Data

US 2023/0097087 A1 Mar. 30, 2023

(30) Foreign Application Priority Data

Sep. 30, 2021 (CN) .......................... 202111162515.8

(51) Int. Cl.
*G06N 3/04* (2023.01)
*G06F 16/901* (2019.01)

(52) U.S. Cl.
CPC ........... *G06N 3/04* (2013.01); *G06F 16/9024* (2019.01)

(58) Field of Classification Search
CPC ........................................................ G06N 3/04
USPC ........................................................ 382/158
See application file for complete search history.

(56) References Cited

U.S. PATENT DOCUMENTS

2020/0210837 A1* 7/2020 Wang ..................... G06N 3/082
2021/0117781 A1* 4/2021 Kim ......................... G06N 3/08
2021/0158131 A1* 5/2021 Jain ........................ G06N 3/063
2023/0141145 A1* 5/2023 Hong ..................... G06N 3/082
706/26

* cited by examiner

*Primary Examiner* — Jennifer Mehmood
*Assistant Examiner* — Karsten Foster Lantz
(74) *Attorney, Agent, or Firm* — ScienBiziP, P.C.

(57) ABSTRACT

An image detection method obtains a neural network model including n operators. End operators are determined from the n operators. An image is input into the neural network model. Whether to delete operation results of the n operators is determined according to the n operators and the end operators when the neural network model processes the image using the n operators. A detection result of the image is output according to the operation results. The method can improve an efficiency of image detection.

17 Claims, 6 Drawing Sheets

IMAGE DETECTION METHOD BASED ON NEURAL NETWORK MODEL, ELECTRONIC DEVICE, AND STORAGE MEDIUM

FIELD

The subject matter herein generally relates to image processing, specifically an image detection method based on a neural network model, an electronic device, and a storage medium.

BACKGROUND

When an image is detected by a neural network model installed in an electronic device, data as to features of the image will be passed between operators of the neural network model. Input and output data of each operator should be recorded, and further detection of the image is performed accordingly. Some neural network models may include many operators, and amounts of input and output data of the operators may be huge. The huge amounts of data may use a lot of memory of the electronic device, resulting in slow image detection.

BRIEF DESCRIPTION OF THE DRAWINGS

In order to more clearly describe the technical solutions in the embodiments of the present disclosure or the prior art, the following will briefly introduce the drawings that need to be used in the description of the embodiments or the prior art. Obviously, the drawings in the following description are only examples. For those of ordinary skill in the art, other drawings can be obtained according to the provided drawings without creative work.

DETAILED DESCRIPTION

For clarity of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Figure 1:
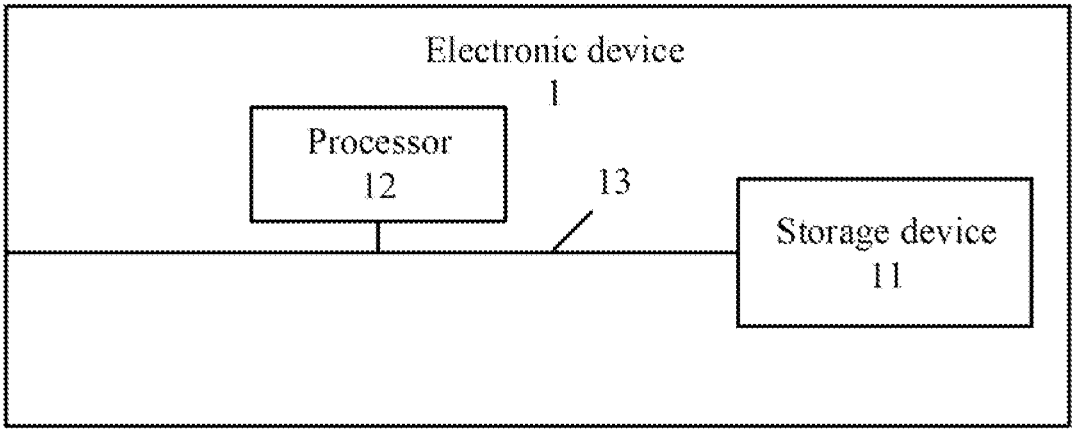
FIG. 1 is a block diagram of an electronic device implementing an image detection method based on a neural network model in one embodiment of the present disclosure.

FIG. 1 is a block diagram of an electronic device implementing an image detection method based on a neural network model in one embodiment of the present disclosure. The electronic device 1 includes, but is not limited to, a storage device 11, at least one processor 12, and a communication bus 13. The storage device 11 and at least one processor 12 are connected via the communication bus 13 or connected directly.

The electronic device 1 can be any electronic product that can interact with a user, such as a personal computer, a tablet computer, a smart phone, a personal digital assistant (PDA), a smart wearable device, etc. Those skilled in the art will understand that electronic device 1 is only an example, and does not constitute a limitation. Other examples of electronic device 1 may include more or fewer components than shown in FIG. 1, or combine some components, or have different components. For example, the electronic device 1 may further include an input/output device, a network access device, and the like.

Figure 2:
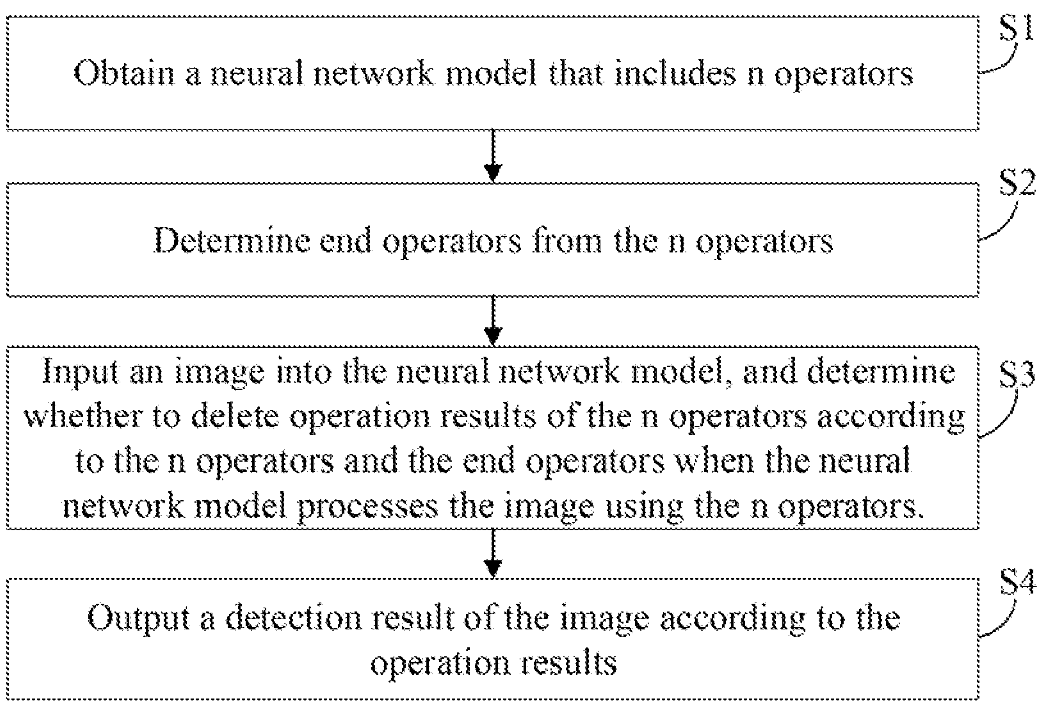
FIG. 2 is a flowchart of the image detection method based on the neural network model provided in one embodiment of the present disclosure.

FIG. 2 is a flowchart of the image detection method based on the neural network model in one embodiment. The method can detect and classify images quickly. The method may be executed by an electronic device (e.g., electronic device 1 in FIG. 1). According to different requirements, the order of the blocks in the flowchart may be changed, and some blocks may be omitted.

In block S1, the electronic device obtains a neural network model. The neural network model includes n operators.

The neural network model may be obtained from a network. The neural network model may be optimized after obtaining from the network. Optimization of the neural network model can include operations such as operator fusion, network pruning, model quantization, and network cutting on the neural network model. In the embodiment, the neural network model includes n operators denoted as op1, op2, . . . , opn.

In block S2, the electronic device determines end operators from the n operators.

In one embodiment, the electronic device determines each operator subset of the neural network model according to the n operators, and sets a last operator in the operator subset as an end operator of the operator subset.

When applying the neural network model to perform image detection, the electronic device records input data and output data of operators of the neural network model. The amount of input and output data may be huge. In order to increase a speed of the image detection, the electronic device can determine the operator subsets of the neural network model. The electronic device can release data of the operator subsets that are useless or have been used, so as to reduce memory use and speed up the image detection.

In one embodiment, the electronic device determines each operator subset of the neural network model according to the n operators as follows ((1)-(6)).

Figure 5:
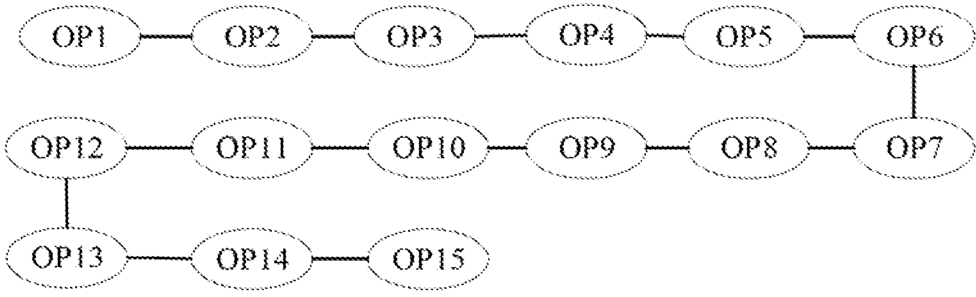
FIG. 5 shows a singly-linked list in one embodiment of the present disclosure.

(1) The electronic device maps the neural network model to a singly-linked list according to logical relationship between the n operators. The singly-linked list includes n nodes. The n nodes can be denoted as OP1, OP2, . . . , OPi, . . . , and Opn. Each of the n nodes corresponds to an operator in the neural network model. According to the logical relationship between the n operators, multiple singly-linked lists can be obtained. In one embodiment, a singly-linked list OP1→OP2→ . . . →OPn is selected. FIG. 5 shows a singly-linked list in one embodiment of the present disclosure.

Figure 6:
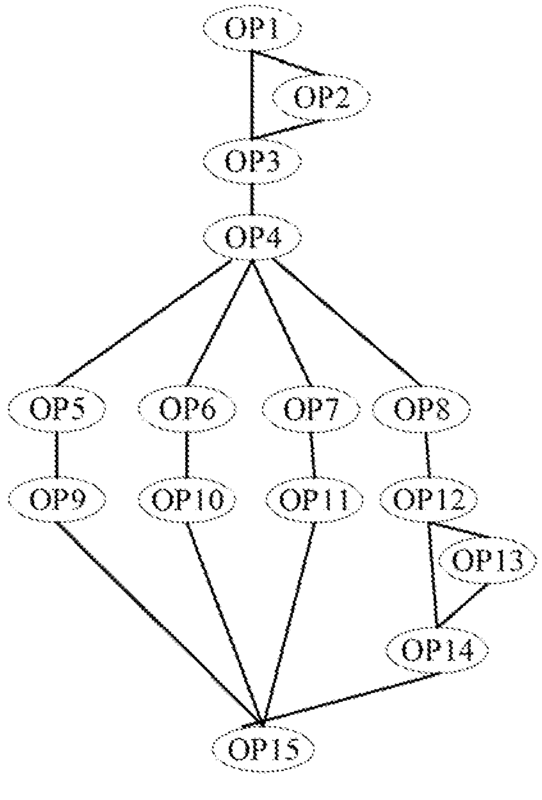
FIG. 6 shows data transmission between nodes in one embodiment of the present disclosure.

(2) The electronic device selects each of the n nodes, and calculates an output number and an input number of each of the n nodes. An output number of the node OPi can be denoted as ai, and an input number of the node OPi can be denoted as bi. The output number ai of the node OPi indicates how many operators that the operator opi sends data to in the neural network model, and the input number bi of the node OPi indicates how many operators the operator opi receives data from in the neural network model. FIG. 6 shows data transmission between nodes in one embodiment of the present disclosure. In FIG. 6, an input number of the node OP4 is 1, and an output number of the node OP4 is 4.

(3) The electronic device establishes a vector of data pairs corresponding to the singly-linked list according to the output number and the input number of each of the n nodes. The vector is denoted as [[a1,b1], [a2,b2], . . . , [ai,bi], . . . , [an,bn]], where ai is the output number of the node OPi, and bi is the input number of the node Opi.

(4) The electronic device determines a plurality of node subsets according to the vector.

Figure 3:
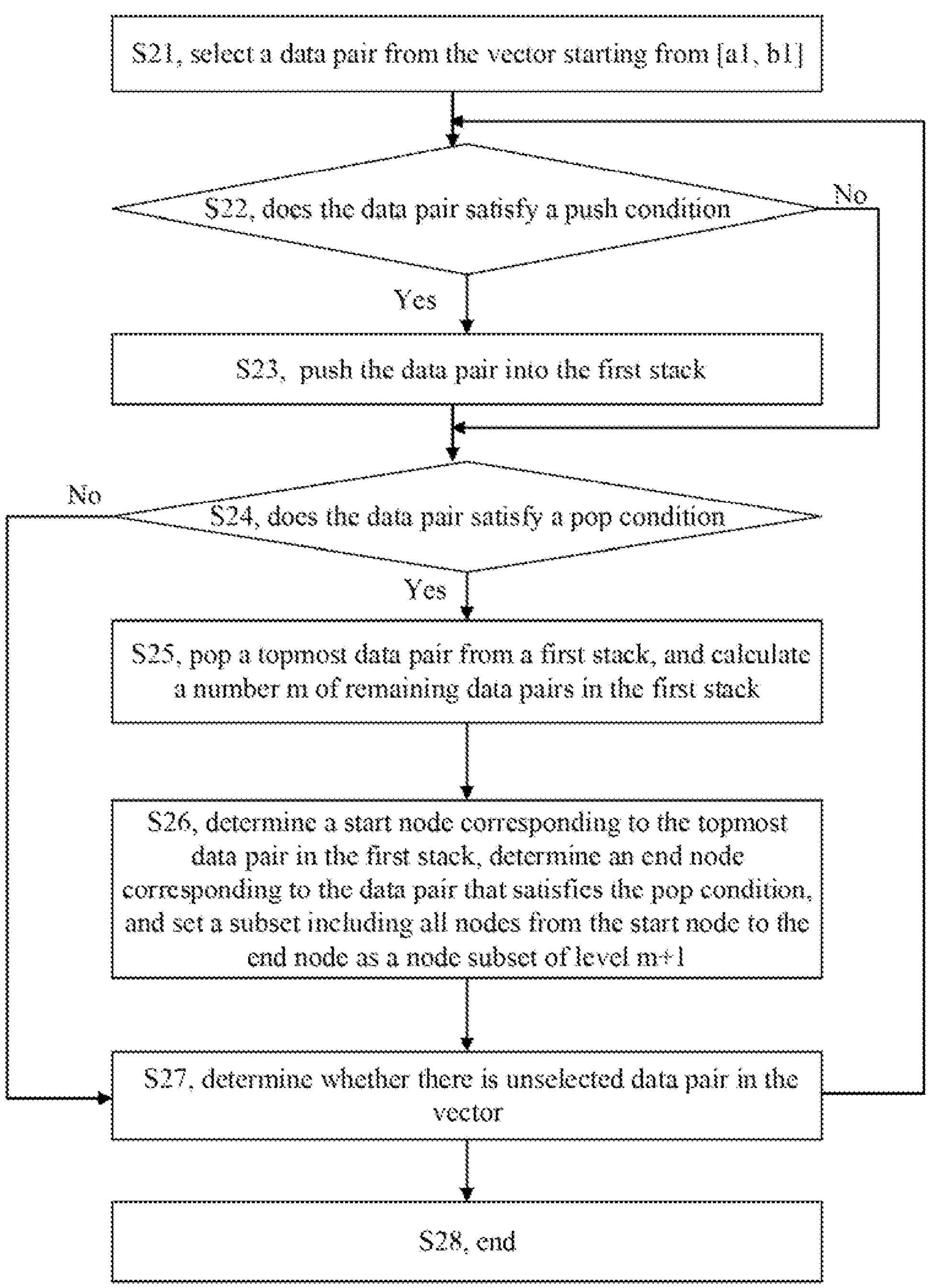
FIG. 3 is a detailed flowchart of determining a plurality of node subsets according to a vector of data pairs in one embodiment of the present disclosure.

FIG. 3 is a detailed flowchart of determining a plurality of node subsets according to the vector in one embodiment of the present disclosure. According to different requirements, the order of the blocks in the flowchart may be changed, and some blocks may be omitted.

In block S21, the electronic device selects a data pair from the vector starting from [a1, b1].

In block S22, the electronic device determines whether the data pair satisfies a push condition of a first stack. If the data pair satisfies the push condition, the process goes to S23. If the data pair does not meet the push condition, the process goes to step 24. The push condition is used for push data into the first stack. In one embodiment, the push condition is that the output number of ai in the data pair [ai,bi] is greater than or equal to 2.

In block S23, the electronic device pushes the data pair into the first stack.

In block S24, the electronic device determines whether the data pair satisfies a pop condition of the first stack. If the data pair satisfies the pop condition, the process goes to step 25. If the data pair does not satisfy the pop condition, the process goes to step 27. The push condition is used for pop data from the first stack. In one embodiment, the pop condition is that the input number of bi in the data pair [ai,bi] is greater than or equal to 2.

In block S25, the electronic device pops a topmost data pair from the first stack, and calculates a number m of remaining data pairs in the first stack.

In block S26, the electronic device determines a start node corresponding to the topmost data pair in the first stack, determines an end node corresponding to the data pair that satisfies the pop condition, and sets a subset including all nodes from the start node to the end node as a node subset of level m+1.

In block S27, the electronic device determines whether there is unselected data pair in the vector. The process goes to S21 if there is unselected data pair in the vector.

If there is no unselected data pair in the vector, in block S58, the process ends.

(5) The electronic device determines the operator subset of the neural network model according to the plurality of node subsets. Among the plurality of node subsets obtained according to S21 to S28, there are no two node subsets which have an identical node, or a certain node subset may belong to other node subset. For different situations, methods of determining the operator subsets of the neural network model according to the plurality of node subsets may also be different.

In one embodiment, determining the operator subset of the neural network model according to the plurality of node subsets may include: traversing the plurality of node subsets; and setting each of the plurality of node subsets as an operator subset of the neural network model if there is no identical node in any two of the node subsets.

In another embodiment, determining the operator subset of the neural network model according to the plurality of node subsets may include: traversing the plurality of node subsets to obtain first node subsets and second node subsets, wherein the second node subsets comprise the first node subsets; removing nodes that are identical to the first node subsets from the second node subsets to obtain filtered second node subsets; and setting nodes in the filtered second node subsets as an operator subset of the neural network model. There is no identical node in the first node subsets and the filtered second node subsets.

(6) The electronic device determines an end operator of each operator subset. In one embodiment, a last operator in the operator subset is set as the end operator of the operator subset. Data that are not to input to the end operators can be released, so as to reduce memory occupation of the neural network model.

In block S3, the electronic device inputs an image into the neural network model, and determines whether to delete operation results of the n operators according to the n operators and the end operators when the neural network model processes the image using the n operators.

When the neural network model detects the image, the n operators perform operations on the image in sequence. After an operator perform an operation on the image, an operation result of the operation is transmitted to a next operator. After the n operators completes the operations, the detection of the image ends.

If the next operator is not an end operator, after the operation result of the operator is transmitted to the next operator, the operation result is useless for the image detection, so the operation result can be deleted, so as to reduce the memory occupancy.

Figure 4:
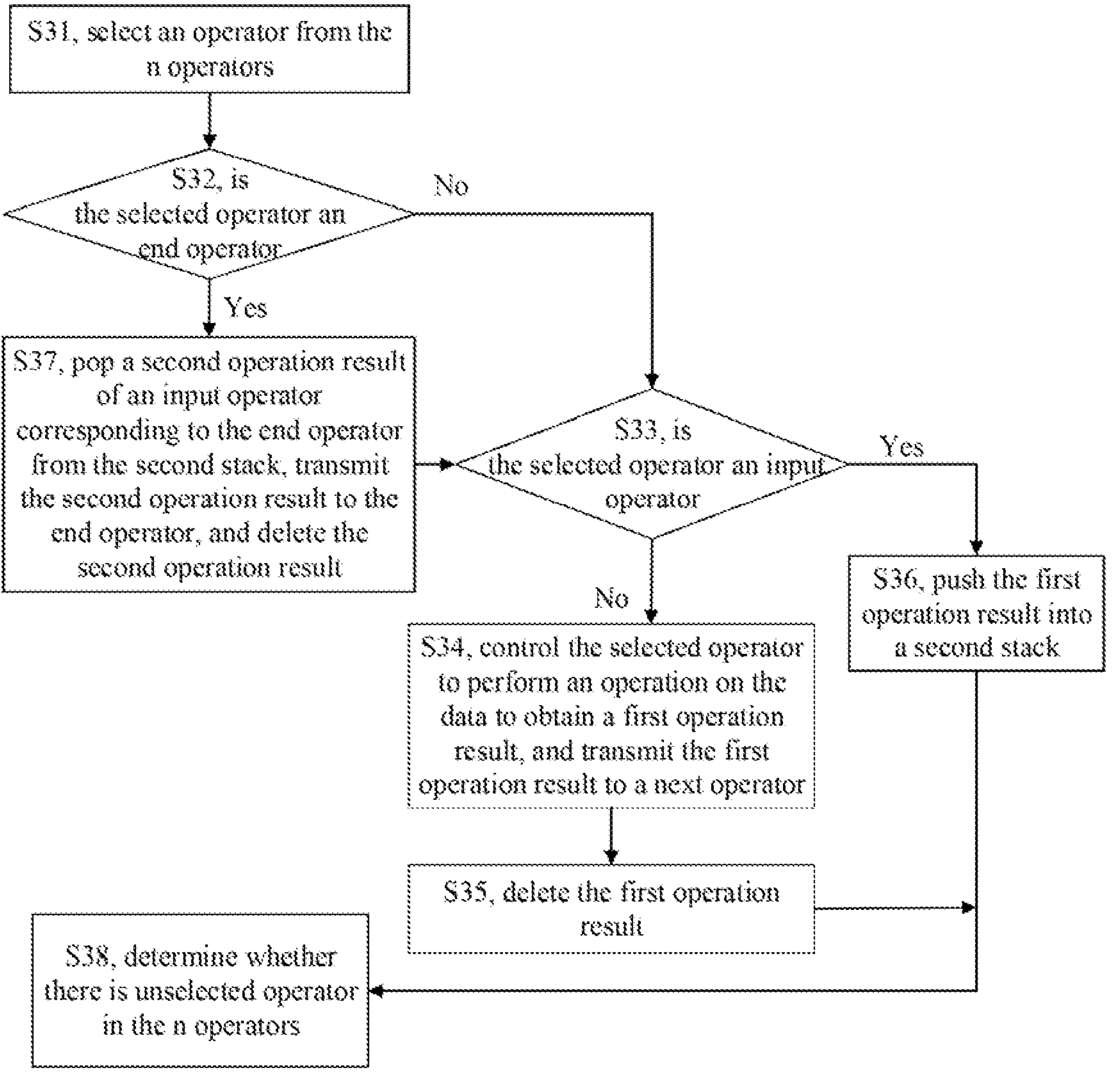
FIG. 4 is a detailed flowchart of determining whether to delete operation results of n operators according to the n operators and end operators in the n operators in one embodiment of the present disclosure.

FIG. 4 is a detailed flowchart of determining whether to delete operation results of the n operators according to the n operators and the end operators in one embodiment of the present disclosure. According to different requirements, the order of the blocks in the flowchart may be changed, and some blocks may be omitted.

In block S31, the electronic device selects an operator ("selected operator") from the n operators.

In block S32, the electronic device determines whether the selected operator is an end operator. If the selected operator is not an end operator, the process goes to S33. If the selected operator is an end operator, the process goes to S37.

In block S33, the electronic device determines whether the selected operator is an input operator that transfers data to the end operator. If the selected operator is not an input operator, the process goes to S34. If the selected operator is an input operator, the process goes to S36.

In block S34, the electronic device controls the selected operator to perform an operation on the data to obtain a first operation result, and transmits the first operation result to a next operator. The next operator is logically next to the selected operator.

In block S35, the electronic device deletes the first operation result after the first operation result is transmitted to the next operator. The process goes to S38.

In block S36, the electronic device pushes the first operation result into a second stack. The process goes to S38.

In block S37, the electronic device pops a second operation result of an input operator corresponding to the end operator from the second stack, transmits the second operation result to the end operator, and deletes the second operation result. The process goes to S33.

In block S38, the electronic device determines whether there is unselected operator in the n operators. The process goes to S31 if there is unselected operator in the n operators.

FIG. 6 shows data transmission between nodes in one embodiment of the present disclosure. In FIGS. 6, OP3, OP14 and OP15 are end nodes corresponding to end operators of the neural network model.

Referring to FIG. 6, the electronic device may select a node starting from OP1.

OP1 is not an end node, but an input node of an end node OP3. Therefore, after OP1 operates an operation on data, an operation result of OP1 is pushed into the second stack.

OP2 is not an end node, but an input node of the end node OP3. Therefore, after OP2 operates an operation on the data, an operation result of OP2 is pushed into the second stack.

OP3 is an end node. Therefore, the operation results of the input nodes OP1 and OP2 are popped from the second stack and transmitted to OP3. After the operation results of OP1 and OP2 are transmitted to OP3, the operation results of OP1 and OP2 are deleted. Since OP3 is not an input operator, an operation result of OP3 is deleted after OP2 performs an operation on the data according to the operation results of OP1 and OP2. The operation result of OP3 is transmitted to OP4.

OP4 is neither an end node nor an input node. Therefore, after OP4 performs an operation on the data, an operation result of OP4 is transmitted to OP5, OP6, OP7 and OP8. Then the operation result of OP4 is deleted.

Each of OP5, OP6, OP7, and OP8 is neither an end node nor an input node. Therefore, after OP5, OP6, OP7, and OP8 performs operations on the data, operation results of OP5, OP6, OP7, and OP8 are transmitted to OP9, OP10, OP11, and OP12. Then the operation results of OP5, OP6, OP7, and OP8 are deleted.

OP9, OP10, and OP11 are not an end nodes, but input nodes of an end node OP15. Therefore, operation results of OP9, OP10 and OP11 are pushed into the second stack.

OP12 is not an end node, but an input node of an end node OP14. Therefore, an operation result of OP12 is pushed into the second stack.

OP13 is not the end node, but an input node of the end node OP14. Therefore, an operation result of OP13 is pushed into the second stack.

OP14 is an end node. Therefore, the operation results of the input nodes OP12 and OP13 are popped from the second stack. After the operation results of OP12 and OP13 are transmitted to OP14, the operation results of OP12 and OP13 are deleted. Since OP14 is an input operator of an end node OP15, an operation result of OP14 is pushed into the second stack.

OP15 is an end node. Therefore, the operation results of OP9, OP10, OP11, and OP14 are popped from the second stack.

By releasing the operation results that are useless anymore, memory occupation can be reduced and the image detection efficiency can be improved.

In block S4, the electronic device outputs a detection result of the image according to the operation results.

A last operator of the neural network model performs a last operation on the image to obtain a last operation result. The last operation result can be output as the detection result of the image.

For example, the image includes cells to be detected. The n operators extract features of the cells in the image. The method deletes features of the cell that have been extracted and are useless anymore, so as to reduce memory occupation and improve an efficiency of image detection.

In FIG. 1, a computer program (such as an image detection system) may be stored in the storage device 11 and executable by the processor 12. The processor 12 may execute the computer program to implement the blocks in the method described above.

The storage device 11 may be an internal memory of the electronic device 1, that is, a memory built into the electronic device 1. The storage device 11 may also be an external memory of the electronic device 1, that is, a memory externally connected to the electronic device 1.

The storage device 11 is used for storing program codes and various data, and accesses programs and data during the operation of the electronic device 1.

The storage device 11 may include a storage program area and a storage data area. The storage program area may store an operating system, and programs required by at least one function, etc.; the storage data area may store data and the like created in the use of the electronic device 1. In addition, the storage device 11 may include non-volatile memory, such as a hard disk, a memory, a plug-in hard disk, a smart memory card (SMC), a secure digital (SD) card, a flash memory card (Flash Card), at least one magnetic disk storage device, flash memory device, or other non-volatile solid state storage device.

The processor 12 may be a central processing unit (CPU) or other general-purpose processor, a digital signal processor (DSP), an application-specific integrated circuit (ASIC), a field-programmable gate array (FPGA) or other programmable logic device, a discrete gate, or a transistor logic device, or a discrete hardware component, etc. The processor 12 may be a microprocessor or any conventional processor. The processor 12 may be a control center of the electronic device 1, and connect various parts of the entire electronic device 1 by using various interfaces and lines.

In an exemplary embodiment, the computer program may be divided into one or more modules, and the one or more modules are stored in the storage device 11 and executed by the processor 12 to complete the method of the present disclosure. The one or more modules can be a series of computer-readable instruction segments capable of performing specific functions, and the instruction segments are used to describe execution processes of the computer program in the electronic device 1.

When the modules integrated in the electronic device 1 are implemented in the form of software functional units and used as independent units, they can be stored in a non-transitory readable storage medium. According to this understanding, all or part of the processes in the method of the above embodiments implemented by the present disclosure can also be completed by related hardware instructed by computer-readable instructions. The computer-readable instructions may be stored in a non-transitory readable storage medium. The computer-readable instructions, when executed by the processor, may implement the blocks of the foregoing method embodiments. The computer-readable instructions include computer-readable instruction codes, and the computer-readable instruction codes can be source code, object code, an executable file, or in some other intermediate form. The non-transitory readable storage medium may include any entity or device capable of carrying the computer-readable instruction code, a recording medium, a U disk, a mobile hard disk, a magnetic disk, an optical disk, a computer memory, and a read-only memory (ROM).

Although not shown, the electronic device 1 may also include a power source (such as a battery) for supplying power to various components. The power source may be logically connected to the at least one processor 12 through a power management device, so as to realize functions such as charging, discharging, and power consumption management. The power supply may also include direct current or alternating current power supplies, recharging devices, power failure detection circuits, power converters or inverters, and power status indicators. The electronic device 1 may also include various sensors, BLUETOOTH modules, WI-FI modules, etc.

In several embodiments provided in the preset disclosure, it should be understood that the disclosed electronic device and method may be implemented in other ways. For example, the embodiments of the electronic device described above are merely illustrative. For example, the units are only divided according to logical function, and there may be other manners of division in actual implementation.

The modules described as separate components may or may not be physically separated, and the components displayed as modules may or may not be physical modules, that is, may be located in one place, or may be distributed on multiple network elements. Some or all of the modules may be selected according to actual needs to achieve the purpose of the method.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable an electronic device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

I claim:

1. An image detection method based on a neural network model, the method being executed by an electronic device and comprising:

obtaining a neural network model comprising n operators;

determining end operators from the n operators;

inputting an image into the neural network model, and determining whether to delete operation results of the n operators according to the n operators and the end operators when the neural network model processes the image using the n operators, and comprising: performing operations on the image in sequence by the n operators; after performing an operation on the image by an operator of the n operators, transmitting a first operation result of the operation to a next operator of the n operators; in a case that the next operator is not an end operator, deleting the first operation result; in a case that the next operator is the end operator, popping a second operation result of an input operator corresponding to the end operator, after transmitting the second operation result to the end operator, deleting the second operation result; and outputting a detection result of the image according to the operation results.

2. The image detection method of claim 1, wherein determining end operators from the n operators comprises:

determining each operator subset of the neural network model according to the n operators; and setting a last operator in the operator subset as the end operator of the operator subset.

3. The image detection method of claim 2, wherein determining each operator subset of the neural network model according to the n operators comprises:

mapping the neural network model to a singly-linked list according to logical relationship between the n operators, the singly-linked list comprising n nodes;

selecting each of the n nodes, and calculating an output number and an input number of each of the n nodes;

establishing a vector of data pairs corresponding to the singly-linked list according to the output number and the input number of each of the n nodes, the n nodes denoted as OP1, OP2, . . . , OPi, . . . and OPn, the vector denoted as [a1,b1], [a2,b2], . . . , [ai,bi], . . . , , ai being the output number of the node OPi, bi being the input number of the node OPi;

determining a plurality of node subsets according to the vector; and determining the operator subset of the neural network model according to the plurality of node subsets.

4. The image detection method of claim 3, wherein determining a plurality of node subsets according to the vector comprises:

step 21, selecting a data pair from the vector starting from [a1, b1];

step 22, determining whether the data pair satisfies a push condition of a first stack, going to step 23 when the data pair satisfies the push condition, and going to step 24 when the data pair does not meet the push condition;

step 23, pushing the data pair into the first stack;

step 24, determining whether the data pair satisfies a pop condition of the first stack, going to step 25 when the data pair satisfies the pop condition, and going to step 27 when the data pair does not satisfy the pop condition;

step 25, popping a topmost data pair from the first stack, and calculating a number m of remaining data pairs in the first stack;

step 26, determining a start node corresponding to the topmost data pair in the first stack, determining an end node corresponding to the data pair that satisfies the pop condition, and setting a subset including all nodes from the start node to the end node as a node subset of level m+1; and step 27, determining whether there is unselected data pair in the vector, and going to step 21 when there is unselected data pair in the vector.

5. The image detection method of claim 4, wherein when the input number of bi in the data pair [ai,bi] is greater than or equal to 2, it is determined that the data pair [ai, bi] satisfies the pop condition; and when the output number of ai in the data pair [ai,bi] is greater than or equal to 2, it is determined that the data pair [ai,bi] satisfies the push condition.

6. The image detection method of claim 3, wherein determining the operator subset of the neural network model according to the plurality of node subsets comprises:

traversing the plurality of node subsets; and setting each of the plurality of node subsets as an operator subset of the neural network model when there is no identical node in any two of the plurality of node subsets.

7. The image detection method of claim 3, wherein determining the operator subset of the neural network model according to the plurality of node subsets comprises:

traversing the plurality of node subsets to obtain first node subsets and second node subsets, wherein the second node subsets comprise the first node subsets;

removing nodes that are identical to the first node subsets from the second node subsets to obtain filtered second node subsets; and setting nodes in the filtered second node subsets as an operator subset of the neural network model.

8. An electronic device comprising:

at least one processor; and a storage device storing computer-readable instructions, which when executed by the at least one processor, cause the at least one processor to:

obtain a neural network model comprising n operators;

determine end operators from the n operators;

input an image into the neural network model, and determine whether to delete operation results of the n operators according to the n operators and the end operators when the neural network model processes the image using the n operators, comprising: performing operations on the image in sequence by the n operators; after performing an operation on the image by an operator of the n operators, transmitting a first operation result of the operation to a next operator of the n operators; in a case that the next operator is not an end operator, deleting the first operation result; in a case that the next operator is the end operator, popping a second operation result of an input operator corresponding to the end operator, after transmitting the second operation result to the end operator, deleting the second operation result; and output a detection result of the image according to the operation results.

9. The electronic device of claim 8, wherein the at least one processor is further caused to:

map the neural network model to a singly-linked list according to logical relationship between the n operators, the singly-linked list comprising n nodes;

select each of the n nodes, and calculating an output number and an input number of each of the n nodes;

establish a vector of data pairs corresponding to the singly-linked list according to the output number and the input number of each of the n nodes, the n nodes denoted as OP1, OP2, . . . , OPi, . . . , and OPn, the vector denoted as [[a1,b1], [a2,b2], . . . , [ai,bi], . . . , [an,bn]], ai being the output number of the node OPi, bi being the input number of the node OPi;

determine a plurality of node subsets according to the vector;

determine the operator subset of the neural network model according to the plurality of node subsets; and set a last operator in the operator subset as the end operator of the operator subset.

10. The electronic device of claim 9, wherein the at least one processor is further caused to:

step 21, select a data pair from the vector starting from [a1, b1];

step 22, determine whether the data pair satisfies a push condition of a first stack, go to step 23 when the data pair satisfies the push condition, and go to step 24 when the data pair does not meet the push condition;

step 23, push the data pair into the first stack;

step 24, determine whether the data pair satisfies a pop condition of the first stack, go to step 25 when the data pair satisfies the pop condition, and go to step 27 when the data pair does not satisfy the pop condition;

step 25, pop a topmost data pair from the first stack, and calculating a number m of remaining data pairs in the first stack;

step 26, determine a start node corresponding to the topmost data pair in the first stack, determine an end node corresponding to the data pair that satisfies the pop condition, and set a subset including all nodes from the start node to the end node as a node subset of level m+1; and step 27, determine whether there is unselected data pair in the vector, and go to step 21 when there is unselected data pair in the vector.

11. The electronic device of claim 9, wherein the at least one processor is further caused to:

traverse the plurality of node subsets; and set each of the plurality of node subsets as an operator subset of the neural network model when there is no identical node in any two of the plurality of node subsets.

12. The electronic device of claim 9, wherein the at least one processor is further caused to:

traverse the plurality of node subsets to obtain first node subsets and second node subsets, wherein the second node subsets comprise the first node subsets;

remove nodes that are identical to the first node subsets from the second node subsets to obtain filtered second node subsets; and set nodes in the filtered second node subsets as an operator subset of the neural network model.

13. A non-transitory storage medium having stored thereon computer-readable instructions that, when the computer-readable instructions are executed by a processor to implement the following method:

obtaining a neural network model comprising n operators;

determining end operators from the n operators;

inputting an image into the neural network model, and determining whether to delete operation results of the n operators according to the n operators and the end operators when the neural network model processes the image using the n operators, comprising: performing operations on the image in sequence by the n operators; after performing an operation on the image by an operator of the n operators, transmitting a first operation result of the operation to a next operator of the n operators; in a case that the next operator is not an end operator, deleting the first operation result; in a case that the next operator is the end operator, popping a second operation result of an input operator corresponding to the end operator, after transmitting the second operation result to the end operator, deleting the second operation result; and outputting a detection result of the image according to the operation results.

14. The non-transitory storage medium of claim 13, wherein determining end operators from the n operators comprises:

mapping the neural network model to a singly-linked list according to logical relationship between the n operators, the singly-linked list comprising n nodes;

selecting each of the n nodes, and calculating an output number and an input number of each of the n nodes;

establishing a vector of data pairs corresponding to the singly-linked list according to the output number and the input number of each of the n nodes, the n nodes denoted as OP1, OP2, . . . , OPi, . . . , and OPn, the vector denoted as [[a1,b1], [a2,b2], . . . , [ai,bi], . . . , [an,bn]], ai being the output number of the node OPi, bi being the input number of the node OPi;

determining a plurality of node subsets according to the vector; and determining the operator subset of the neural network model according to the plurality of node subsets; and setting a last operator in the operator subset as the end operator of the operator subset.

15. The non-transitory storage medium of claim 14, wherein determining a plurality of node subsets according to the vector comprises:

step 21, selecting a data pair from the vector starting from [a1, b1];

step 22, determining whether the data pair satisfies a push condition of a first stack, going to step 23 when the data pair satisfies the push condition, and going to step 24 when the data pair does not meet the push condition;

step 23, pushing the data pair into the first stack;

step 24, determining whether the data pair satisfies a pop condition of the first stack, going to step 25 when the data pair satisfies the pop condition, and going to step 27 when the data pair does not satisfy the pop condition;

step 25, popping a topmost data pair from the first stack, and calculating a number m of remaining data pairs in the first stack;

step 26, determining a start node corresponding to the topmost data pair in the first stack, determining an end node corresponding to the data pair that satisfies the pop condition, and setting a subset including all nodes from the start node to the end node as a node subset of level m+1; and step 27, determining whether there is unselected data pair in the vector, and going to step 21 when there is unselected data pair in the vector.

16. The non-transitory storage medium of claim 14, wherein determining the operator subset of the neural network model according to the plurality of node subsets comprises:

traversing the plurality of node subsets; and setting each of the plurality of node subsets as an operator subset of the neural network model when there is no identical node in any two of the plurality of node subsets.

17. The non-transitory storage medium of claim 14, wherein determining the operator subset of the neural network model according to the plurality of node subsets comprises:

traversing the plurality of node subsets to obtain first node subsets and second node subsets, wherein the second node subsets comprise the first node subsets;

removing nodes that are identical to the first node subsets from the second node subsets to obtain filtered second node subsets; and setting nodes in the filtered second node subsets as an operator subset of the neural network model.

* * * * *